United States Patent [19]
Mun

[11] Patent Number: 5,088,867
[45] Date of Patent: Feb. 18, 1992

[54] FASTENERS THAT BLEED FLUID UPON FAILURE

[76] Inventor: Kam C. Mun, 9532 Ralph St., Rosemead, Calif. 91770

[21] Appl. No.: 618,392

[22] Filed: Nov. 26, 1990

[51] Int. Cl.⁵ .................. F16B 31/02; G01L 5/00
[52] U.S. Cl. .................................. 411/13; 411/14; 411/43; 411/395; 411/504; 116/212; 116/DIG. 34; 73/761
[58] Field of Search ............ 411/13, 14, 395, 43, 411/504; 109/34; 285/93; 73/761, 779, 774; 116/212, DIG. 34

[56] References Cited

U.S. PATENT DOCUMENTS

| | | | |
|---|---|---|---|
| 1,977,358 | 10/1934 | Stevens | 109/34 |
| 3,602,186 | 8/1971 | Popenoe | 411/13 |
| 3,799,108 | 3/1974 | Mosow | 411/13 |
| 3,987,699 | 10/1976 | Popenoe | 411/13 |
| 4,481,902 | 11/1984 | Meyer et al. | 116/212 |
| 4,777,901 | 10/1988 | Marsden et al. | 411/13 |
| 4,826,027 | 5/1989 | Nilson | 116/212 |

Primary Examiner—Neill R. Wilson

[57] ABSTRACT

A failure indicating device wherein a fluid is encased within a bore in a fastener. In another embodiment of the invention, the fluid is encased within a thin walled capsule which in turn is encapsulated within a bore in the fastener. Upon failure of the fastener, the encased fluid will leak out into the external surface and its detection will indicate that the fastener has failed. The stress which causes the fastener to fail will also assist the fluid to leak out onto its external surface. To facilitate the leakage of the fluid, one or more shallow and narrow groove(s) may be machined onto the external surface of the fastener so that the leaked fluid will travel along this groove(s) to the preferred external end of the fastener. This is desirable in cases where only one side of the joint is accessible.

28 Claims, 5 Drawing Sheets

FASTENERS THAT BLEED FLUID UPON FAILURE

BACKGROUND OF THE INVENTION

This invention relates to fasteners that have fluid embedded within their bodies such that they bleed upon failure. The detection of such fluid on the external surface of the fasteners will indicate that the fasteners have failed.

Structural members are often joined together using fasteners. When these fasteners fail due to factors such as metal fatigue or overloading, they often fracture into two or more parts such that their failure will not be visible from the outside. This is even more evident in cases where only one side of the joint is accessible and blind rivets have been used.

Prior to this invention, if the fastener is a bolt, it is always possible to test the structural soundness of the bolt by using a torque wrench. But if after installation and assembly, only one side of the bolt is accessible, such physical testing may necessitate the disassembly of the parts and physically testing the bolts one by one. Such testing can be laborious, if not prohibitively expensive.

Patents which are of background interest are:
Charles H. Popenoe, U.S. Pat. No. 3,602,186
Jack E. Mosow, U.S. Pat. No. 3,799,108
Charles E. Popenoe, U.S. Pat. No. 3,987,699

The above listed patents describe stress-strain indicators wherein a change in length of a strain member produces a change in color of a visual indicator. However, these patents are designed to measure minute displacement of the fasteners rather than their failure. When the fasteners fail, the visual indicators do show a bright color. However, the detection of fluid outside of the fasteners as described in this invention, gives a far better confirmation of fastener failure than the appearance of a bright color of the visual indicators. Moreover, the fasteners as described in this invention have the added advantage of simplicity and far lower costs due to the fact that the sole purpose of the fluid is to indicate failure of the fasteners.

SUMMARY OF THE INVENTION

The object of this invention is to devise a fastener which will bleed fluid upon failure. The detection of such fluid on the external surface of the fastener will indicate that it has failed.

Briefly summarized, the fastener of this invention has one or more bore(s) extending from the head of the fastener into the body. The space in the bore(s) is then filled with a fluid and then sealed off with a seal and a plug which has an interference fit with the head of the fastener. In another embodiment of the invention, the space in the bore is filled with a capsule made of a thin wall and containing a fluid. A plug which has an interference fit with the fastener is then used to encase the capsule, containing the fluid, within the bore in the fastener.

Upon fracture of the fastener into two or more parts due to factors such as metal fatigue or overloading, fluid which is encased within the bore of the fastener will leak out into its external surface. In another embodiment, the fluid is encased within a thin walled capsule within the bore and the stress which causes the fastener to fracture will also cause the thin walled capsule to break and the encased fluid will leak out into the external surface of the fastener. To facilitate the leakage of the fluid, one or more shallow and narrow grooves may be machined onto the external surface of the fastener so that the leaked fluid will travel along this narrow groove(s) to the preferred external end of the fastener. The detection of this fluid on the external surface of the fastener will indicate thet the fastener has failed.

DETAILED DESCRIPTION OF THE INVENTION

Figure 6:
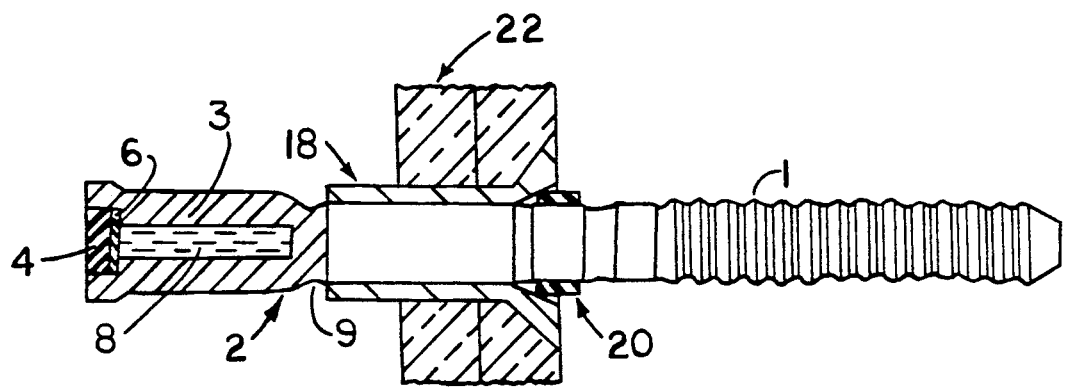
FIG. 6 is an assembly drawing showing the elevational cross sectional view of the blind rivet pin of FIG. 1 together with its sleeve and locking collar inserted through two structural members to be fastened together.

A blind rivet pin has three components: namely the blind rivet pin 2, the sleeve 18 and the collar 20 as shown in FIG. 6. Referring back to FIG. 1, it shows this invention embodied in the head 3 of a blind rivet pin 2. The blind rivet pin also has a tail end 1 with serrated edges.

Figure 1:
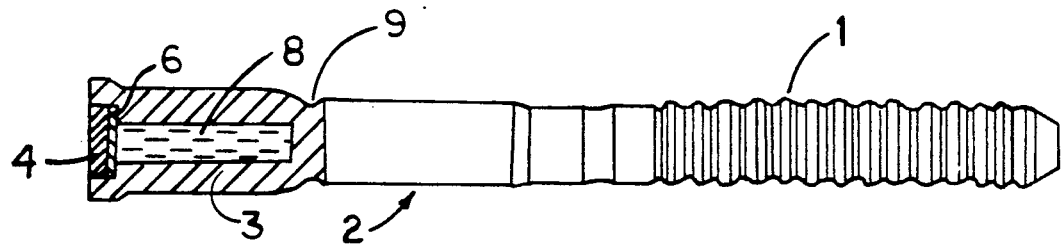
FIG. 1 is an elevational cross sectional view of one embodiment of the invention showing the fluid encased within a bore in the head of a blind rivet pin.
Figure 2:
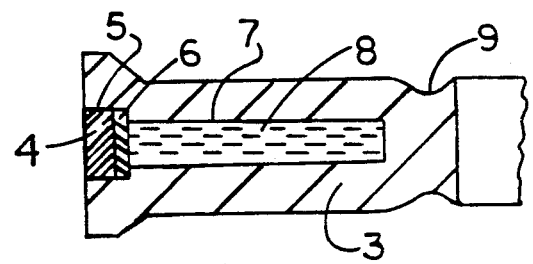
FIG. 2 is an enlarged view of the head portion of the embodiment of FIG. 1.

Referring to FIG. 2, which is an enlarged view of the head of FIG. 1, an axial bore 7 is drilled from the head end to a point near the neck 9 of the blind rivet pin. A counterbore 5 is then made as shown. The axial bore 7 is filled with a fluid 8, and sealed off with a seal 6 and a plug 4 which has an interference fit with the counterbore 5. Alternatively, an adhesive or screw threads may be used to secure plug 4 to counterbore 5.

Figure 3:
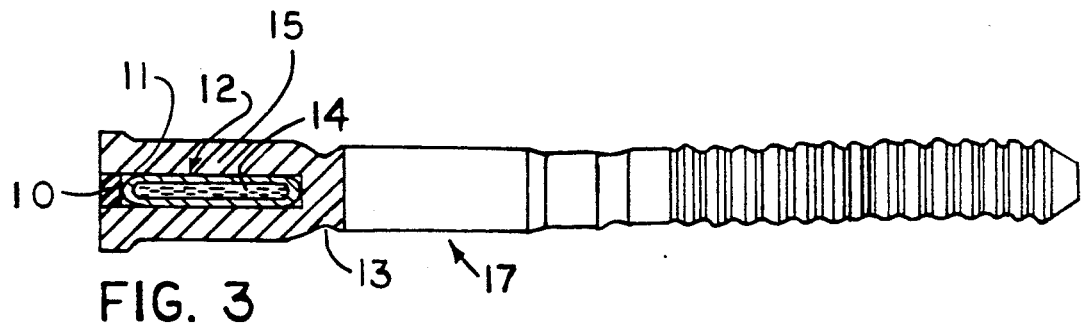
FIG. 3 is an elevational cross sectional view of one embodiment of the invention showing the fluid encased within a thin walled capsule within a bore made in the head of a blind rivet pin.

FIG. 3 shows another application of this invention to the head 15 of a blind rivet pin 17. An axial bore 11 is drilled from the head end to a point near the neck 13 of the blind rivet pin. The space in the bore 11 is then filled with a capsule 12 made of a thin wall and containing the fluid 14. A plug 10 is then used to encase the capsule within the bore in the fastener. An interference fit or adhesive or screw threads may be used to secure plug 10 to the bore 11. The capsule 12 should have a thin wall so that the stress which causes the fastener to fracture will also cause the thin walled capsule 12 to break. For example, the capsule can be a thin walled glass capsule.

Figure 4:
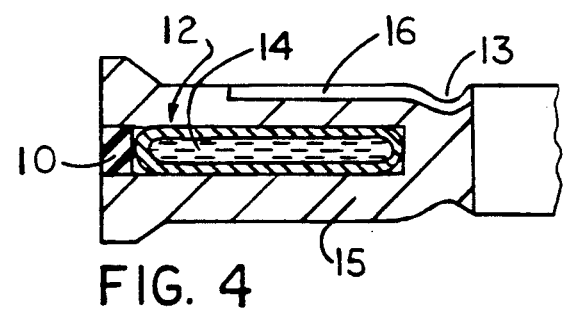
FIG. 4 is an enlarged view of the head portion of the embodiment of FIG. 5.
Figure 5:
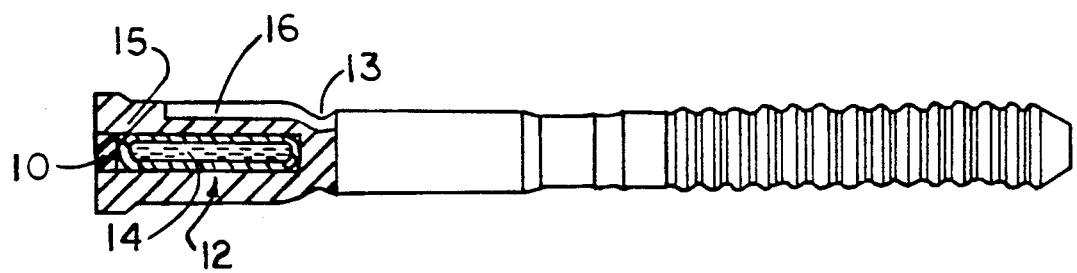
FIG. 5 is an elevational cross sectional view of the embodiment of FIG. 3 with an additional shallow and narrow groove running along the external surface of the head of the blind rivet pin.

The embodiment as shown in FIG. 5 is similar to that of FIG. 3 except for one or more shallow and narrow groove(s) 16 machined onto the external surface of the fastener as shown. FIG. 4 is an enlarged view of the head portion of FIG. 5. The depth of the groove(s) 16 as shown in FIGS. 4 and 5 has been exaggerated for clarity.

FIG. 6 shows the blind rivet pin of FIG. 1 together with its sleeve 18 and locking collar 20 inserted through two structural members 22 to be fastened together. In the ensuing riveting process, a riveting gun is used to grip and pull the tail end 1 of the blind rivet pin so that the head 3 is pulled toward and eventually deforms sleeve 18, and locking collar 20 is compressed, deforms and flows into the neck 9. On further pulling, the blind rivet pin breaks at the neck 9 leaving the two structural members tightly joined together. This is shown in FIG. 7.

Figure 7:
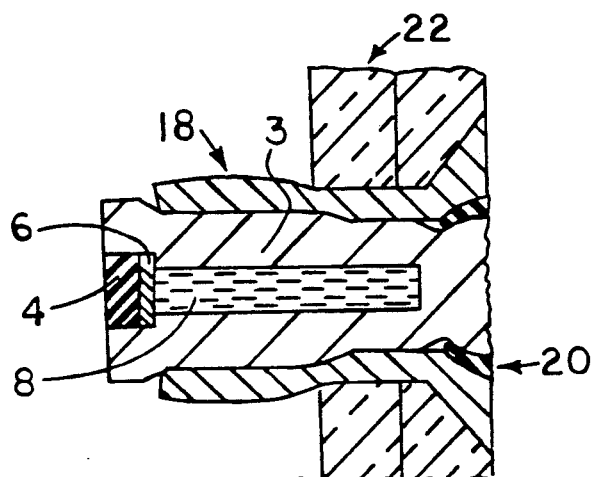
FIG. 7 is an elevational cross sectional view showing the two structural members fastened together after a riveting gun has been used to pull the tail end of the blind rivet pin of FIG. 6 so that the blind rivet pin breaks at the neck, leaving the blind rivet pin head, sleeve, locking collar and the two structural members tightly fastened together.

Referring to FIG. 7, when the blind rivet fails due to factors such as metal fatigue or overloading or both, it fractures into two or more parts so that the fracture would not be visible from the access side, which is the side showing the locking collar 20.

However, the fluid 8 will then flow along any line or lines of fracture and also along any gap in the interface between head 3 and sleeve 18, or between sleeve 18 and structural members 22, or both, to the external surface. The detection of the leaked fluid 8 on the external surface at the access side will indicate that the fastener has failed.

Figure 8:
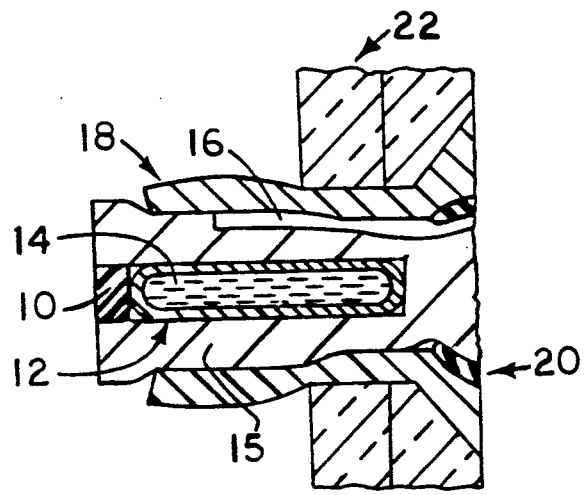
FIG. 8 is an elevational cross sectional view similar to FIG. 7 except that the blind rivet pin of FIG. 5 has been used in the riveting process.

Referring to FIG. 8, when the blind rivet fails, and fractures into two or more parts, the stress which causes the fastener to fracture will also cause the thin walled capsule 12 to break and the encased fluid 14 will leak out. It will then travel along any line or lines of fracture and also along any gap in the interface between head 15 and sleeve 18 or between sleeve 18 and structural members 22, or both, to the external surface. To facilitate the movement of the leaked fluid 14, one or more shallow and narrow groove(s) 16 may be machined onto the external surface of the fastener so that the fluid will travel along this groove(s) to the external surface of the fastener at the access side. The detection of this leaked fluid will then indicate that the fastener has failed.

FIGS. 9, 10, 11, 12 and 13 show embodiments of the invention when the fastener is a rivet.

Figure 9:
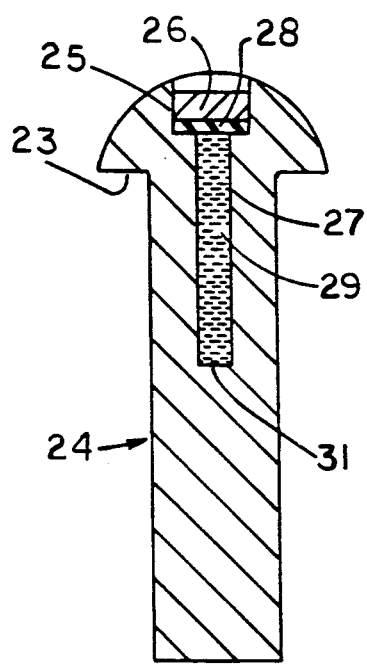
FIG. 9 is an elevational cross sectional view of one embodiment of the invention showing the fluid encased within a bore made in a rivet.

FIG. 9 shows this invention embodied in a rivet 24. An axial bore 27 is drilled from the head end to a depth so that the distance from the end of the bore 31 to the flat surface 23 of the rivet head is approximately equal to the combined thickness of the structural members to be joined. It should be mentioned that other depths work just as well, albeit not the preferred embodiment. A counterbore 25 is then made as shown. The axial bore 27 is filled with a fluid 29 and sealed off with a seal 28 and a plug 26 which has an interference fit with the counterbore 25. Alternatively, an adhesive or screw threads may be used to secure plug 26 to counterbore 25.

Figure 10:
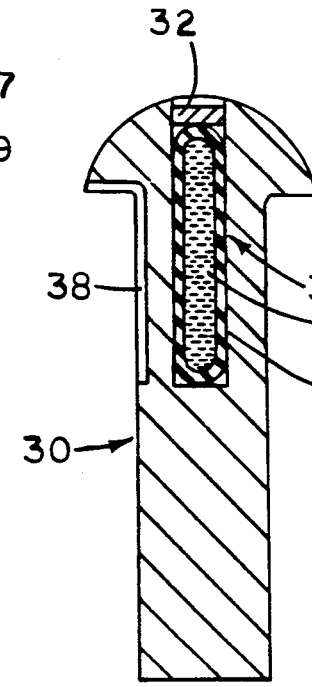
FIG. 10 is an elevational cross sectional view of one embodiment of the invention showing the fluid encased within a thin walled capsule within a bore made in a rivet. As shown, a shallow and narrow groove is also machined onto its external surface.

FIG. 10 shows another embodiment of this invention when the fastener is a rivet 30. An aixal bore 33 is drilled from the head end to a depth similar to that of the axial bore 27 of FIG. 9. It should be mentioned that other depths work just as well, albeit not the preferred embodiment. The space in the bore 33 is then filled with a capsule 34 made of a thin wall and containing the fluid 36. A plug 32 is then used to encase the capsule within the bore in the fastener. An interference fit or adhasive or screw threads may be used to secure plug 32 to the bore 33. The capsule 34 should have a thin wall so that the stress which causes the fastener to fracture will also cause the thin walled capsule 34 to break. For example, the capsule can be a thin walled glass capsule. One or more shallow and narrow groove(s) 38 is machined onto the external surface of the fastener as shown.

Figure 11:
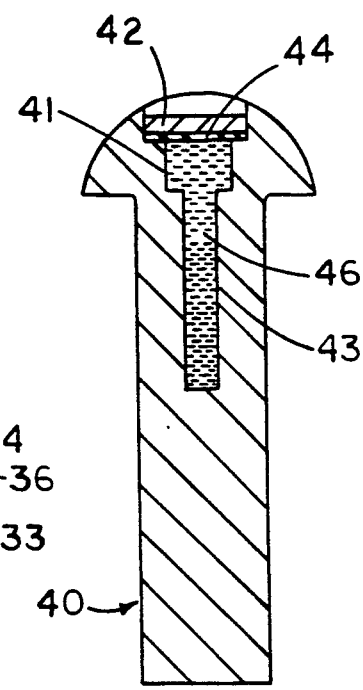
FIG. 11 is an elevational cross sectional view of one embodiment of the invention showing the fluid encased within the space made by two bores of different diameters made in a rivet.

FIG. 11 shows another embodiment of this invention when the fastener is a rivet 40. This embodiment is similar to that of FIG. 9 except that the fluid 46 is now encased within the space made by two axial bores 41 and 43 of different diameters. It is sealed off with a seal 44 and a plug 42.

Figure 12:
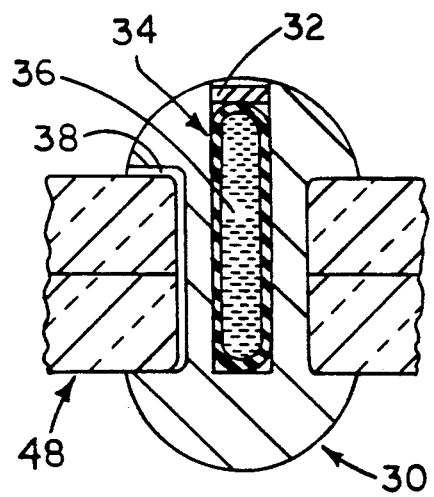
FIG. 12 is an elevational cross sectional view showing two structural members tightly fastened together using the rivet of FIG. 10 in the riveting process.

FIG. 12 shows the rivet of FIG. 10 as it is used to rivet together the two structural members 48. When the rivet fails, it fractures into two or more parts so that the fracture will not be visible from the external surface. However, the stress which causes the rivet to fracture will also cause the thin walled capsule 34 to break and the encased fluid 36 will leak out. It will then travel along any line or lines of fracture or along any gap in the interface between rivet 30 and structural members 48, to the external surface. One or more shallow and narrow groove(s) 38 may be machined onto the external surface of the rivet so that the fluid will travel along the groove(s) to the external end of the rivet at the preferred side. The detection of this leaked fluid will then indicate that the rivet has failed.

Figure 13:
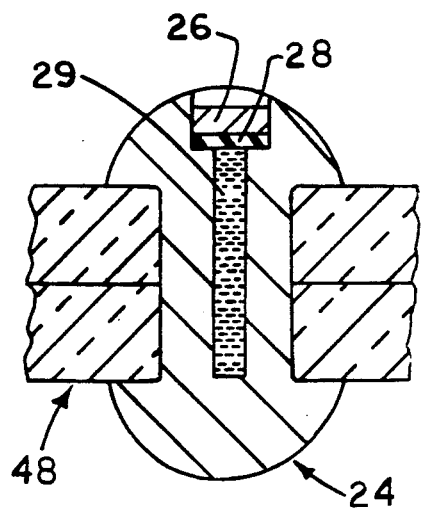
FIG. 13 is an elevational cross sectional view showing two structural members tightly fastened together using the rivet of FIG. 9 in the riveting process.

FIG. 13 shows the rivet of FIG. 9 as it is used to rivet together the two structural members 48. When the rivet fails and fractures into two or more parts, the fluid 29 will then flow along any line or lines of fracture and also along any gap in the interface between rivet 24 and structural members 48, to the external surface. The detection of the leaked fluid will then indicate that the rivet has failed.

FIGS. 14, 15, 16 and 17 show embodiments of the invention when the fastener is a bolt.

Figure 14:
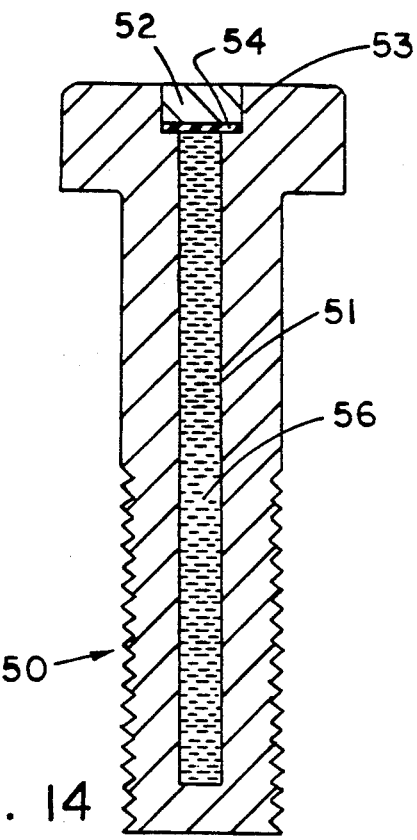
FIG. 14 is an elevational cross sectional view of one embodiment of the invention showing the fluid encased within a bore made in a bolt.

FIG. 14 shows this invention embodied in a bolt 50. An axial bore 51 is drilled from the head end to a depth near the tail end of the bolt. It should be mentioned that other depths work just as well, albeit not the preferred embodiment. A counterbore 53 is then made as shown. The axial bore 51 is then filled with a fluid 56 and sealed off with a seal 54 and a plug 52. An interference fit or adhesive or screw threads may be used to secure plug 52 to counterbore 53.

Figure 15:
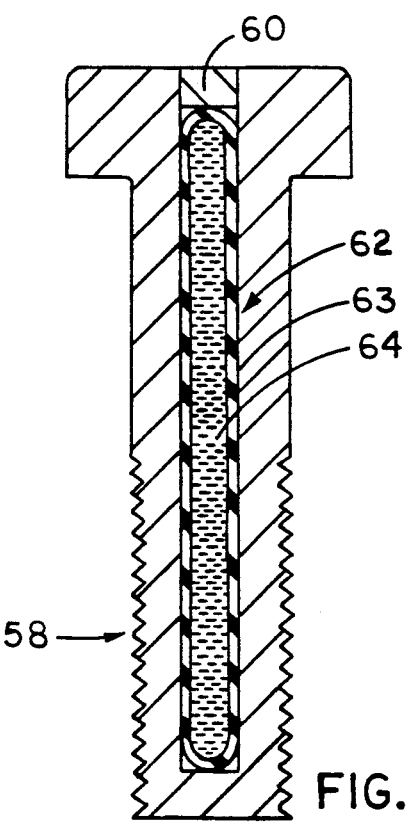
FIG. 15 is an elevational cross sectional view of one embodiment of the invention showing the fluid encased within a thin walled capsule within a bore made in a bolt.

FIG. 15 shows another embodiment of this invention when the fastener is a bolt 58. An axial bore 63 is drilled from the head end to a depth near the tail end of the bolt. Other depths may work just as well, albeit not the preferred embodiment. The space in the bore 63 is then filled with a capsule 62 made of a thin wall and containing the fluid 64. A plug 60 is then used to encase the capsule within the bore in the fastener. An interference fit or adhesive or screw threads may be used to secure plug 60 to the bore 63. The capsule 62 should have a thin wall so that the stress which causes the fastener to fracture will also cause the thin walled capsule 62 to break. The encased fluid 64 will then leak out along any line or lines of fracture or along any gap in the interface between the bolt and the structural members, to the external surface. The detection of this leaked fluid will indicate that the bolt has failed.

Figure 16:
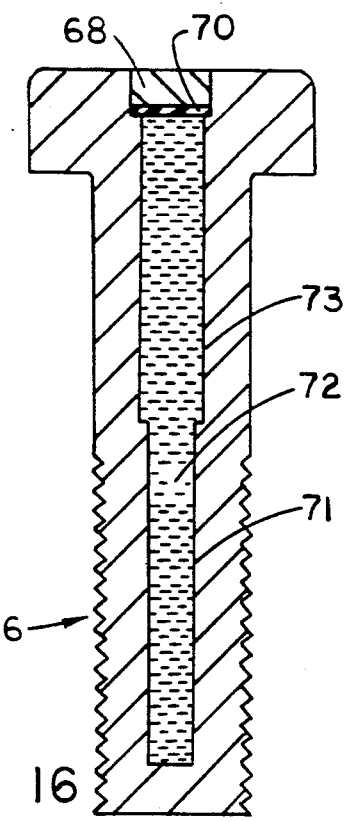
FIG. 16 is an elevational cross sectional view of one embodiment of the invention showing the fluid encased within the space made by two bores of different diameters made in a bolt.

FIG. 16 shows another embodiment of this invention. This embodiment is similar to that of FIG. 14 except that the fluid 72 is now encased within the space made by two axial bores 71 and 73 of different diameters. It is sealed off with a seal 70 and a plug 68.

Figure 17:
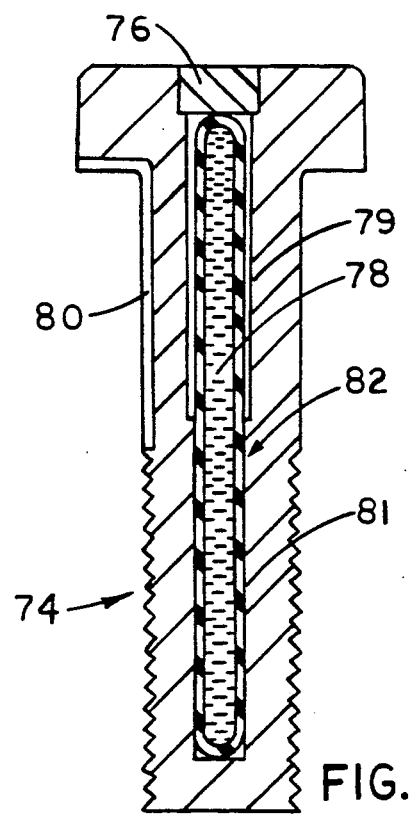
FIG. 17 is an elevational cross sectional view of one embodiment of the invention showing the fluid encased within a thin walled capsule within the space made by two bores of different diameters made in a bolt. As shown, a shallow and narrow groove is also machined onto its external surface.

FIG. 17 shows another embodiment of this invention in a bolt 74. This embodiment is similar to that of FIG. 15 except that the capsule 82 is now encased within the space made by two axial bores 79 and 81. Moreover, one or more shallow and narrow groove(s) 80 is machined onto the external surface of the bolt to facilitate the movement of any leaked fluid 78 to the external surface at the preferred end of the bolt.

The purpose of FIG. 11 and FIG. 16 is to illustrate the fact that the fluid may be encased within a space made by two axial bores within the fastener. In fact, this space may take any shape. For example, this space can be in the shape of a tapered bore. Similarly, the fluid in FIGS. 1, 2, 6, 7, 9, 13, 14, 18 and 22 may be encased within a space which may take any shape. Therefore the shape of the space to contain the fluid within the fastener in this specification and claims, shall not be limited to the examples given here, but may take any shape.

Similarly, the capsule which contains the fluid, as shown in FIGS. 3, 4, 5, 8, 10, 12, 15, 17, 19, 20 and 21, may have any shape as long as it may be contained within the space within the fastener. For example, this capsule may be pear shaped or global shaped. Alternatively, there may be one or more of these capsules within the space within the fastener. Therefore, the shape of the capsule to contain the fluid within the fastener or the number of capsule(s) within the fastener, in this specification and claims, shall not be limited to the examples given here, but the capsule(s) may take any shape or any number within the fastener.

The purpose of FIG. 17 is to illustrate the fact that the capsule 82 which contains the fluid 78 may be encased within the space made by two axial bores 79 and 81 of different diameters. In fact, this space containing the capsule may take any shape and this applies to the space containing the capsule(s) as shown in FIGS. 3, 4, 5, 8, 10, 12, 15, 17, 19, 20 and 21. Therefore, the space containing the capsule(s) within the fastener in this specification and claims shall not be limited to the examples given here, but this space containing the capsule(s) may take any shape.

Figure 18:
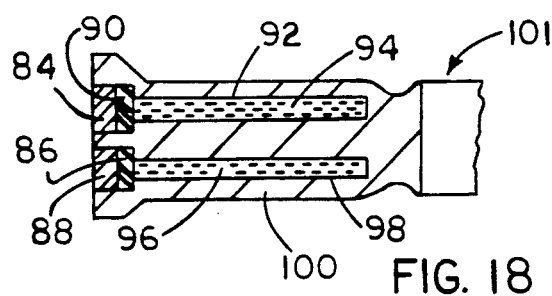
FIG. 18 is an elevational cross sectional view of one embodiment of the invention showing the fluid encased within the spaces made by two separate and distinct bores in the head of a blind rivet pin.

FIG. 18 shows another embodiment of this invention in the head 100 of a blind rivet pin 101. It shows the fluid 94 and 96 encased within the spaces made by two separate and distinct bores 92 and 98. They are then sealed off with seals 86 and 90 and plugs 84 and 88.

Figure 19:
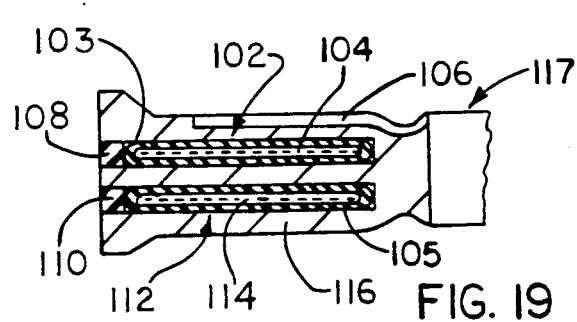
FIG. 19 is an elevational cross sectional view of one embodiment of the invention showing the fluid encased within two thin walled capsules within two separate and distinct bores made in the head of a blind rivet pin.

FIG. 19 shows another embodiment of this invention in the head 116 of a blind rivet pin 117. It shows two thin walled capsules 102 and 112, containing the fluid 104 and 114, encased within two separate and distinct bores 103 and 105 within the head 116. Plugs 108 and 110 are then used to seal the bores.

Figure 20:
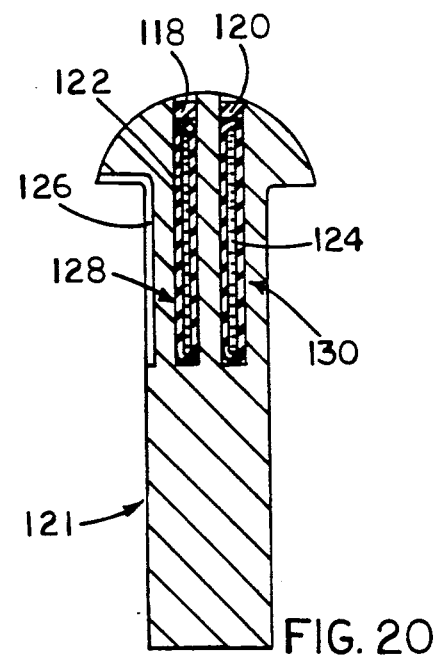
FIG. 20 is an elevational cross sectional view of one embodiment of the invention showing the fluid encased within two thin walled capsules within two separate and distinct bores made in the head of a rivet. As shown, a shallow and narrow groove is also machined onto its external surface.

FIG. 20 shows another embodiment of this invention when the fastener is a rivet 121. It shows two thin walled capsules 128 and 130, containing the fluid 122 and 124, encased within two separate and distinct bores within the rivet. Plugs 118 and 120 are then used to seal the bores. One or more shallow and narrow groove(s) 126 is machined onto the external surface of the rivet.

Figure 21:
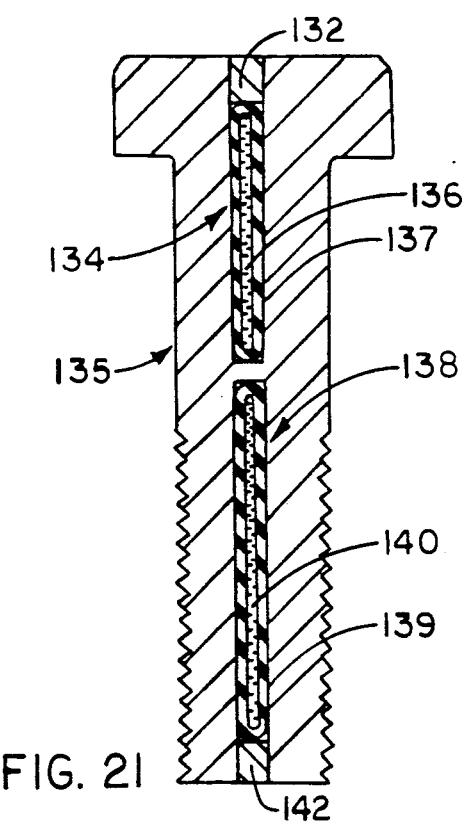
FIG. 21 is an elevational cross sectional view of one embodiment of the invention showing the fluid encased within two thin walled capsules within two separate and distinct bores made in a bolt.

FIG. 21 shows another embodiment of the invention when the fastener is a bolt 135. Two axial bores 137 and 139 may be drilled from both ends of the bolt. The spaces in the bores are then filled with thin walled capsules 134 and 138 containing the fluid 136 and 140. Plugs 132 and 142 are then used to seal the axial bores.

Figure 22:
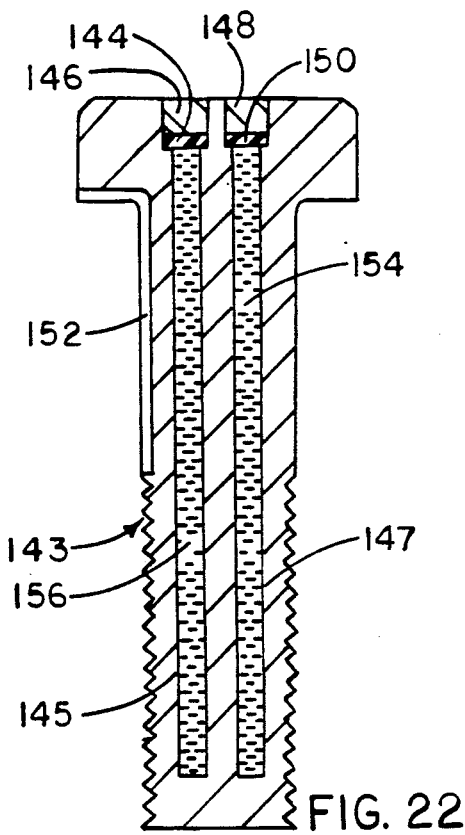
FIG. 22 is an elevational cross sectional view of one embodiment of the invention showing the fluid encased within the spaces made by two separate and distinct bores in a bolt. As shown, a shallow and narrow groove is also machined onto its external surface.

FIG. 22 shows another embodiment of this invention in a bolt 143. It shows the fluid 154 and 156 encased within the spaces made by two separate and distinct bores 145 and 147. They are then sealed off with seals 144 and 150 and plugs 146 and 148.

The purpose of FIGS. 18, 19, 20, 21 and 22 is to illustrate the fact that one or more bore(s) may be made in the fastener to contain the fluid or to contain the thin walled capsule(s) containing the fluid. In the case of FIG. 21, the two axial bores are drilled from both ends and they need not be of the same diameter. In fact, the bore(s) need not be in the axial direction but the preferred embodiments will have axial bore(s) or bore(s) which are parallel to the axis. Therefore the number of bore(s), containing the fluid or containing the capsule(s) filled with the fluid, in this specification and claims, shall not be limited to the examples given here, but may take any number greater than or equal to one.

The fluid which is encased within the fastener, as described in this invention, may take many forms. It may be a red dye or a dye of any color. It may also be a fluorescent dye and an ultra-violet light is shown on the fasteners and any leakage of the fluorescent dye will show up as a bright green color. Alternatively, the fluid is a liquid radioisotope or a gaseous radioisotope so that when the fastener fails, there is an increased level of radioactivity around the fastener which can easily be detected. The fluid may also be a liquid containing magnetic particles so that when the fastener fails, there is an increased level of magnetic flux around the fastener which can easily be detected. The fluid may also be a liquid that conducts electricity so that when the fastener fails, the leaked fluid from two or more adjacent fasteners may merge and form a short circuit between the fasteners. Assuming that the structural members do not conduct electricity or partially conduct electricity, by placing electrical probes between any two fasteners and measuring the electrical resistance between them, the detection of a short circuit will indicate that the fasteners between the probes have failed.

Hence the fasteners will have different types of fluids encased within them. The choice of which type of fastener to use will depend on factors such as cost and usage.

In all the above mentioned embodiments, the stress which causes the fastener to fail will also exert a pressure on the encased fluid and help the fluid to travel along line(s) of fracture or along interfaces to the external surface.

In practice, there may be rows of fasteners and often the stress which causes the fasteners to fail does not occur at a particular point but instead occurs in a localised area and causes more than one fastener to fail. The effect is that when the fasteners as described in this invention fail, detection of a row or rows of leaked fluid is actually quite easy. For example, when the fasteners fail, we may see a row of red dye that has leaked from them.

I claim:

1. A failure indicating device comprising:
   a. a load bearing fastener subject to stress-strain;
   b. a groove on an external surface of said fastener, said groove is not part of any thread, if any, on said fastener;
   c. said fastener is used to join structural members so that after joining, a surface on said fastener is exposed;
   d. means to encase a fluid within the body of said fastener;
   e. whereby upon failure of said fastener, said fluid will leak out and travel along said groove onto said exposed surface of said fastener.

2. The invention of claim 1, wherein said fastener subject to stress-strain is a blind rivet pin.

3. The invention of claim 1, wherein said fastener subject to stress-strain is a rivet.

4. The invention of claim 1, wherein said fastener subject to stress-strain is a bolt.

5. The invention of claim 1, wherein said fastener subject to stress-strain is a screw.

6. The invention of claim 1, wherein said fluid, encased within the body of said fastener subject to stress-strain, is a dye.

7. The invention of claim 1, wherein said fluid, encased within the body of said fastener subject to stress-strain, contains a radioisotope.

8. The invention of claim 1, wherein said fluid, encased within the body of said fastener subject to stress-strain, contains magnetic particles.

9. The invention of claim 1, wherein:
   a. said fluid, encased within the body of said fastener subject to stress-strain, is a liquid that conducts electricity;
   b. said fastener is used to fasten structural members that do not conduct electricity;
   c. means for detecting a short circuit between any two said fasteners;
   d. whereby upon failure of said fastener(s), the detection of a short circuit between any two said fasteners will indicate that one or more fastener(s) has/have failed.

10. A failure indicating device comprising:
    a. a load bearing fastener subject to stress-strain;
    b. a groove on an external surface of said fastener, said groove is not part of any thread, if any, on said fastener;
    c. said fastener is used to join structural members so that after joining, a surface on said fastener is exposed;
    d. a sealed container containing fluid within;
    e. means for containing said container within the body of said fastener;
    f. whereby upon failure of said fastener, the stress which causes said fastener to fail will cause said container to break, releasing said fluid which will travel along said groove onto said exposed surface of said fastener.

11. The invention of claim 10, wherein said fastener subject to stress-strain is a blind rivet pin.

12. The invention of claim 10, wherein said fastener subject to stress-strain is a rivet.

13. The invention of claim 10, wherein said fastener subject to stress-strain is a bolt.

14. The invention of claim 10, wherein said fastener subject to stress-strain is a screw.

15. The invention of claim 10, wherein said fluid, encased within the body of said fastener subject to stress-strain, is a dye.

16. The invention of claim 10, wherein said fluid, encased within the body of said fastener subject to stress-strain, contains a radioisotope.

17. The invention of claim 10, wherein said fluid, encased within the body of said fastener subject to stress-strain, contains magnetic particles.

18. The invention of claim 10, wherein:
    a. said fluid, encased within the body of said fastener subject to stress-strain, is a liquid that conducts electricity;
    b. said fastener is used to fasten structural members that do not conduct electricity;
    c. means for detecting a short circuit between any two said fasteners;
    d. whereby upon failure of said fastener(s), the detection of a short circuit between any two said fasteners will indicate that one or more fastener(s) has/have failed.

19. A failure indicating device comprising:
   a. a load bearing fastener subject to stress-strain and having a bore extending from an external surface of said fastener into its body;
   b. a fluid in said bore;
   c. means for sealing said fluid within said bore;
   d. a groove on an external surface of said fastener, said groove is not part of any thread, if any, on said fastener;
   e. said fastener is used to join structural members so that after joining, a surface on said fastener is exposed;
   f. whereby upon failure of said fastener, said fluid will leak out and travel along said groove onto said exposed surface of said fastener.

20. The invention of claim 19, wherein said fastener subject to stress-strain is a blind rivet pin.

21. The invention of claim 19, wherein said fastener subject to stress-strain is a rivet.

22. The invention of claim 19, wherein said fastener subject to stress-strain is a bolt.

23. The invention of claim 19, wherein said fastener subject to stress-strain is a screw.

24. A failure indicating device comprising:
   a. a load bearing fastener subject to stress-strain and having a bore extending from an external surface of said fastener into its body;
   b. a groove on an external surface of said fastener, said groove is not part of any thread, if any, on said fastener;
   c. said fastener is used to join structural members so that after joining, a surface on said fastener is exposed;
   d. a sealed container containing fluid within;
   e. means to contain said container within said bore;
   f. whereby upon failure of said fastener, the stress which causes said fastener to fail will cause said container to break, releasing said fluid which will travel along said groove onto said exposed surface of said fastener.

25. The invention of claim 24, wherein said fastener subject to stress-strain is a blind rivet pin.

26. The invention of claim 24, wherein said fastener subject to stress-strain is a rivet.

27. The invention of claim 24, wherein said fastener subject to stress-strain is a bolt.

28. The invention of claim 24, wherein said fastener subject to stress-strain is a screw.

* * * * *